(12) United States Patent
Meyer et al.

(10) Patent No.: US 6,868,830 B1
(45) Date of Patent: Mar. 22, 2005

(54) VENTURI INDUCTION FOR INTERNAL COMBUSTION ENGINES

(75) Inventors: James M. Meyer, Morrison, CO (US); Eric A. Meyer, Morrison, CO (US); Michael J. Meyer, Morrison, CO (US)

(73) Assignee: James Meyer Aspen Engineering Services, LLC, Morrison, CO (US)

( * ) Notice: Subject to any disclaimer, the term of this patent is extended or adjusted under 35 U.S.C. 154(b) by 25 days.

(21) Appl. No.: 10/709,571

(22) Filed: May 14, 2004

(51) Int. Cl.[7] .............................................. F02M 7/00
(52) U.S. Cl. ................... 123/445; 261/DIG. 56
(58) Field of Search ...................... 123/445, 472; 261/50.1, 79.1, 81, DIG. 56, DIG. 12

(56) References Cited

U.S. PATENT DOCUMENTS

| | | | | |
|---|---|---|---|---|
| 4,216,753 A | * | 8/1980 | Inoue et al. | 123/445 |
| 4,420,438 A | * | 12/1983 | Goosen | 261/65 |
| 4,444,167 A | * | 4/1984 | You | 123/327 |
| 4,696,278 A | * | 9/1987 | Ito et al. | 123/493 |
| 4,739,651 A | * | 4/1988 | Smith | 73/118.2 |
| 4,741,163 A | | 5/1988 | Hidaka | |
| 4,974,566 A | | 12/1990 | Lorusso | |
| 5,261,236 A | | 11/1993 | Ironside | |
| 5,386,145 A | * | 1/1995 | Boswell | 261/41.1 |
| 5,806,484 A | | 9/1998 | Yoneyama | |
| 6,158,412 A | | 12/2000 | Kim | |
| 6,167,865 B1 | | 1/2001 | Ma | |
| 6,173,695 B1 | | 1/2001 | Davis | |
| 6,283,460 B1 | * | 9/2001 | Omarsson | 261/50.1 |
| 6,431,140 B1 | | 8/2002 | Nishimura | |
| 6,601,562 B2 | | 8/2003 | Buswell | |
| 6,742,335 B2 | * | 6/2004 | Beck et al. | 60/605.2 |

* cited by examiner

*Primary Examiner*—Mahmoud Gimie

(57) ABSTRACT

Air from the intake manifold and fuel from an injector is mixed by a Venturi of adjustable flow path, upstream of an intake valve. Fuel is injected into the throat of the Venturi to improve vaporization and to premix the fuel and air before the mixture enters the combustion chamber. A pressurized manifold from a supercharger or turbocharger system can enhance the action of the Venturi. The Venturi mixing enhances combustion efficiency, resulting in increased power and fuel economy for an internal combustion engine.

4 Claims, 4 Drawing Sheets

VENTURI INDUCTION FOR INTERNAL COMBUSTION ENGINES

SUMMARY OF THE INVENTION

This invention relates to the application of a Venturi to facilitate the mixing of air and fuel to the crankcase of an internal combustion engine. Fuel could be gasoline but could be other hydrocarbons, alcohols, or diesel. The invention enhances the mixing of the fuel and air, resulting in improved combustion.

BACKGROUND OF THE INVENTION

The differential producing Venturi has a long history of uses in many applications. With no abrupt flow restrictions, the Venturi can mix gases and liquids with a minimal total pressure loss. Recently, the Venturi has been used in carbureted engines. The suction from the throat of the Venturi provided the motive force for bringing the fuel in contact with the air. The improved application of the Venturi with the proposed invention is: the metering of the fuel is controlled by the fuel injector instead of the suction of the venturi; the fuel vaporization is facilitated by the reduced pressure in the throat of the Venturi; and mixing of the fuel/air mixture is further facilitated by the turbulent action in the outlet of the Venturi.

The principle behind the operation of the Venturi is the Bernoulli effect. The Venturi mixes vapors and liquids by reducing the cross sectional flow area in the air flow path, resulting in a pressure reduction in the throat of the Venturi. After the pressure reduction, the mixture is passed through a pressure recovery exit section where most of the pressure reduction is recovered. The pressure differential follows Bernoulli's Equation, simplified for a negligible change in elevation:

$$P_1 + \tfrac{1}{2} d_1 v_1^2 = P_2 + \tfrac{1}{2} d_2 v_2^2$$

where,
$P_1$=Pressure at the inlet of Venturi (FIG. 1, location 1);
$P_2$=Pressure at the throat of the Venturi (FIG. 1, location 2);
$d_1$=air density at the inlet of the Venturi (FIG. 1, location 1);
$d_2$=air density at the throat of the Venturi (FIG. 1, location 2);
$v_1$=air velocity at the inlet of the Venturi (FIG. 1, location 1) and; $-v_2$=air velocity at the throat of the Venturi (FIG. 1, location 2).

In FIG. 1, the air enters the Venturi at the location 1 with a cross-sectional area $A_1$, pressure $P_1$, and velocity $v_1$. These properties form the potential and kinetic energy of the fluid at one location. Energy is conserved in a closed system, that is, the sum of potential and kinetic energy at one location must equal the sum of the potential and kinetic energy at any another location in the system. If potential energy decreases at one location, the kinetic energy must proportionally increase at that location. The fluid enters the throat of the Venturi at location 2 with a new area $A_2$, which is smaller than $A_1$. In a closed system mass can be neither created nor destroyed (law of conservation of mass), and as such, the volumetric flow rate at area $A_1$ must equal the volumetric flow rate at area $A_2$. If the area at location $A_2$ is smaller than $A_1$, the fluid must travel faster to maintain the same volumetric flow rate. This increase in velocity results in a decrease in pressure according to the Bernoulli's equation.

DETAILED DESCRIPTION

Figure 1:
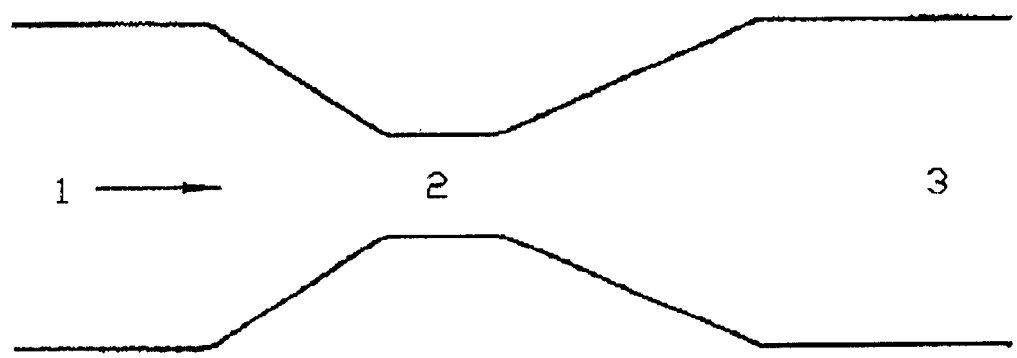
FIG. 1 is a flow diagram for a typical Venturi.
Figure 2:
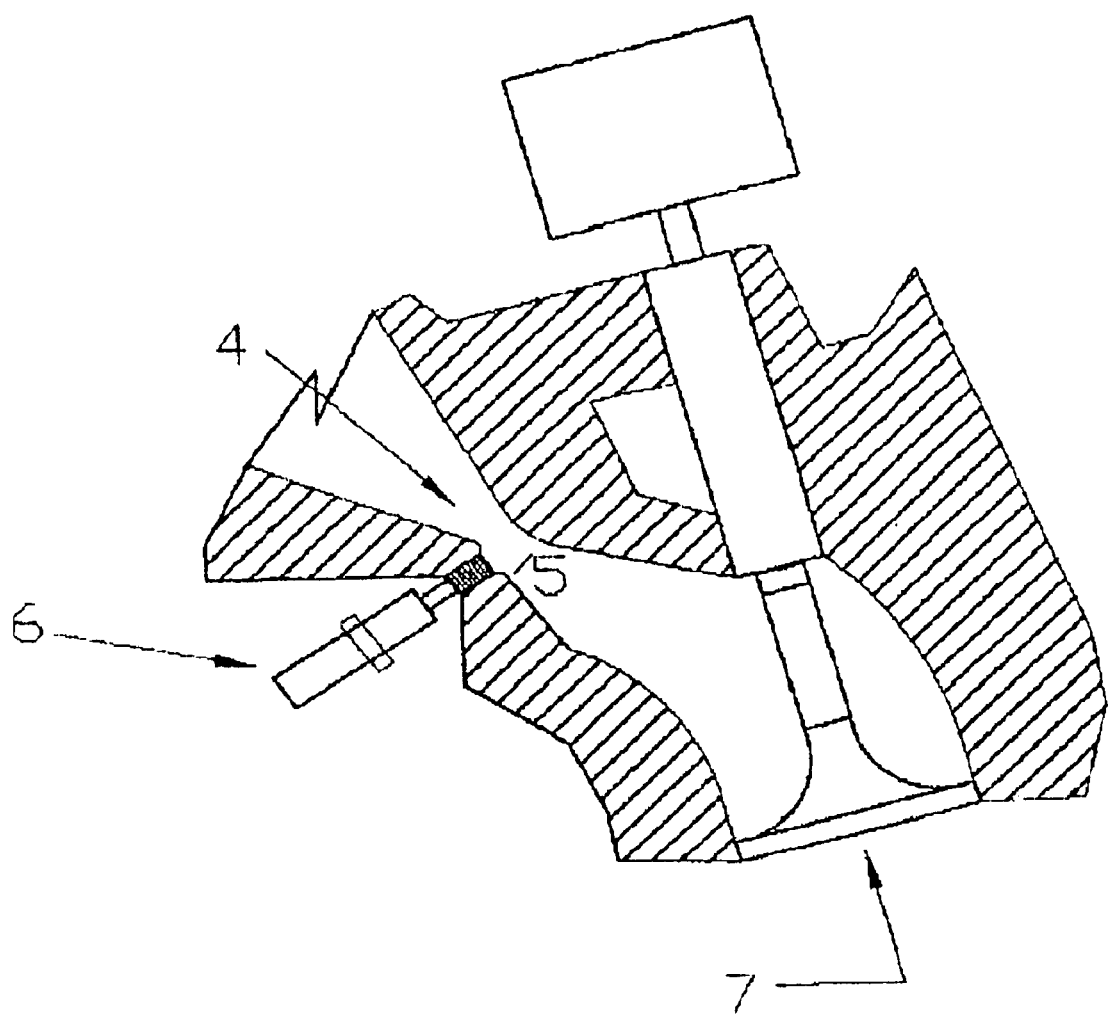
FIG. 2 is a schematic diagram of a fuel/air intake passage improved by enhanced by the utilization of an unregulated Venturi.

FIG. 2 illustrates an internal combustion engine intake system with an unregulated Venturi delivery system. Air 4 flows into the Venturi either from natural engine suction or pressurized flow from a supercharger or a turbocharger. The air flows into the Venturi throat 5 where the pressure is reduced according to the Bernoulli equation. Fuel is metered into the throat of the Venturi with a fuel injector 6. The mixed fuel/air mixture leaves the Venturi and enters the combustion chamber through the intake valve 7.

Figure 3:
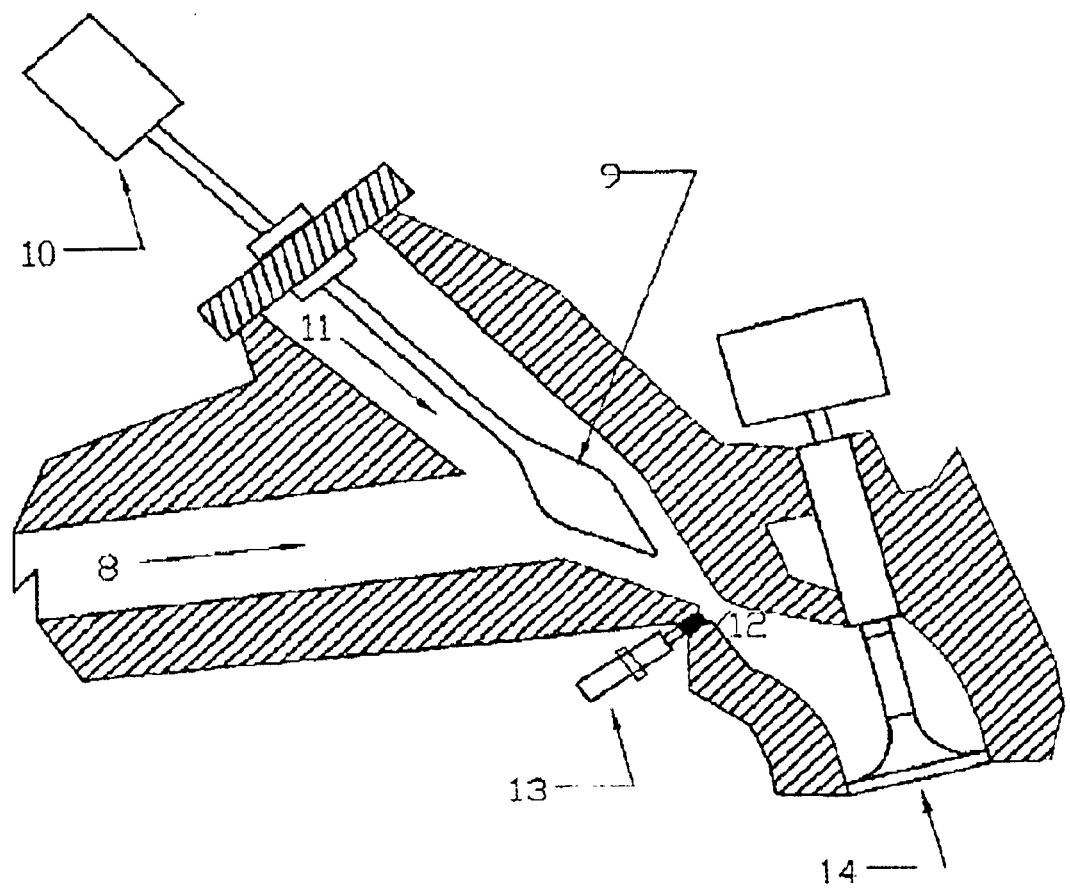
FIG. 3 is a schematic diagram of a fuel/air delivery system for a Venturi with an integrated throttle design to regulate the flow of air into the engine.

FIG. 3 illustrates a regulated fuel/air delivery system consisting of a Venturi and integrated throttle design. Air 8 flows into the Venturi either from engine suction, or pressurization from a supercharger or turbocharger. The air rate is regulated by the throttle 9. The position of the throttle is modulated by an actuator 10 and moves 11 as required by the engine controls. The air flows into a Venturi throat 12 where the pressure is reduced according to the Bernoulli equation. Fuel is metered into the throat of the Venturi with a fuel injector 13. The fuel can be introduced from a fixed location as indicated in FIG. 3 or introduced through the throttle 9. The mixed fuel/air mixture leaves the Venturi and enters the combustion chamber through the intake valve 14.

The regulated Venturi design promotes enhanced fuel/air mixing at all throttle air rates by incorporating the air flow control with the Venturi design. The resulting flow area reduction provides a higher velocity at low throttle than an unregulated Venturi design. Consequently, the air velocity is always high into the throat of the Venturi, improving fuel/air mixing over the entire throttle range.

With the regulated Venturi design, the fuel becomes well mixed with the air because: 1) the reduction in pressure at the throat of the Venturi increases the partial pressure of the fuel and promotes vaporization of the fuel and; 2) turbulence of the two-phase vapor-liquid flow facilitates fuel/air mixing before the combustion chamber.

Figure 4:
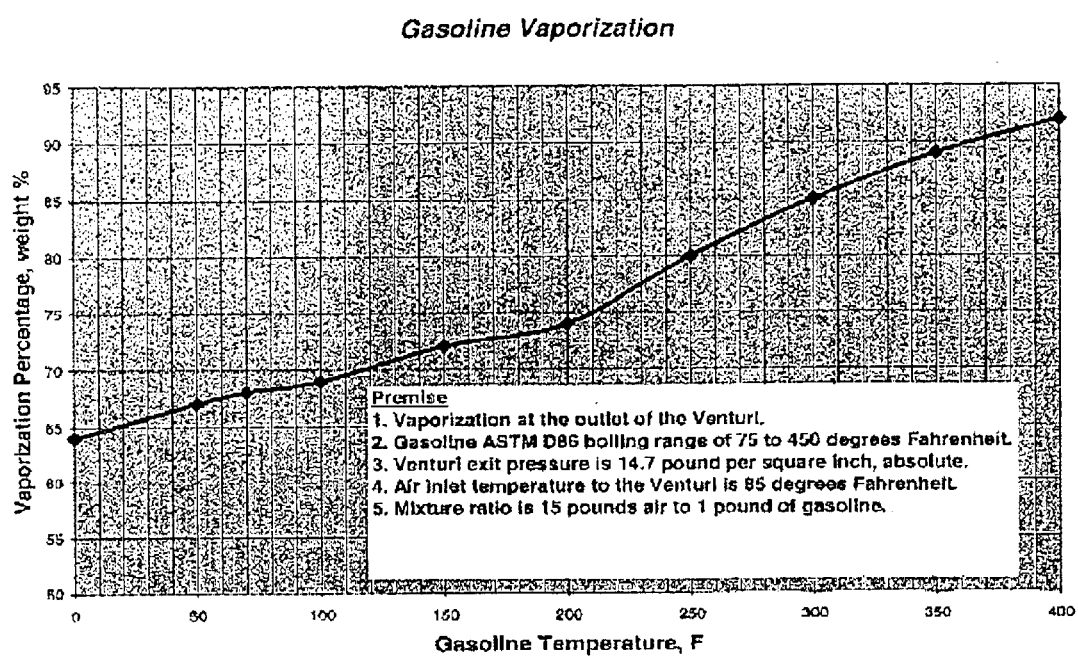
FIG. 4 illustrates the fuel vaporization at the exit of the Venturi as a function of the fuel temperature for a typical gasoline mixture.

By exchanging the heat from the exhaust manifold with the fuel to the engine, the vaporization of the fuel is improved in the Venturi exit over the introduction of fuel at ambient temperature. Gasoline is usually only 68% vaporized at 70 degrees Fahrenheit. A typical exhaust manifold temperature is about 450 degrees Fahrenheit. Consequently, there is sufficient heat available to substantially raise the fuel temperature. The heat transfer from the manifold could be accomplished with several common heat transfer configurations including a double-wall pipe, fin tubes or helical coil. FIG. 4 illustrates the fuel vaporization at the exit of the Venturi as a function of the fuel temperature for a typical gasoline mixture. The pre-heated fuel and Venturi mixing concept complement one another, resulting in better fuel economy and engine performance.

What is claimed is:

1. A fuel/air delivery system for an internal combustion engine comprising: an intake system through which charge air is delivered to a Venturi; with an axial throttle valve located upstream of the Venturi throat; fuel is injected into the throat of the Venturi by means of a pressurized fuel injector; where said delivery system causes the pressure at the point of injection to be reduced due to the Bernoulli effect; whereby said delivery system facilitates fuel vaporization at the throat of the Venturi; whereby said delivery system thoroughly mixes air and fuel in the throat and discharge of the Venturi; and whereby said delivery system pressure is recovered at the discharge of the Venturi.

2. A fuel/air delivery system as stated in claim 1, whereby the performance and efficiency of the engine is improved by the introduction of fuel by means of a fuel injector located at the throat of the venturi.

3. A fuel/air delivery system as stated in claim 1, whereby the Venturi induction performance is complemented by a compressed air intake manifold from a supercharger or turbocharger compressor.

4. A fuel/air delivery system as stated in claim 1, whereby fuel heated from the exhaust manifold and subsequently injected into the Venturi will improve the thermal and combustion efficiency of the engine.

* * * * *